(12) United States Patent
Balain et al.

(10) Patent No.: US 11,485,230 B2
(45) Date of Patent: Nov. 1, 2022

(54) CONTROL PANEL FOR A VEHICLE (71) Applicant: Volvo Truck Corporation, Gothenburg (SE)

(72) Inventors: Frédéric Balain, Saint Clair du Rhone (FR); Remi Barrellon, Simandres (FR); Jerome Vigneron, Chaponost (FR)

(73) Assignee: Volvo Truck Corporation, Gothenburg (SE)

( * ) Notice: Subject to any disclaimer, the term of this patent is extended or adjusted under 35 U.S.C. 154(b) by 302 days.

(21) Appl. No.: 16/765,545

(22) PCT Filed: Nov. 24, 2017

(86) PCT No.: PCT/IB2017/001653
§ 371 (c)(1),
(2) Date: May 20, 2020

(87) PCT Pub. No.: WO2019/102246
PCT Pub. Date: May 31, 2019

(65) Prior Publication Data
US 2020/0307379 A1 Oct. 1, 2020

(51) Int. Cl.
*B60K 35/00* (2006.01)
*B60K 37/06* (2006.01)

(52) U.S. Cl.
CPC .............. *B60K 35/00* (2013.01); *B60K 37/06* (2013.01); *B60K 2370/119* (2019.05);
(Continued)

(58) Field of Classification Search
CPC .. B60K 35/00; B60K 37/06; B60K 2370/119; B60K 2370/122; B60K 2370/1438;
(Continued)

(56) References Cited

U.S. PATENT DOCUMENTS

| 9,696,542 B2 * | 7/2017 | Kim ........................ B60K 37/06 |
| 2004/0131361 A1 * | 7/2004 | Bischoff ............... G06F 3/0421 |
| | | 398/116 |

(Continued)

FOREIGN PATENT DOCUMENTS

| DE | 102012217461 A1 | 6/2014 |
| DE | 102015009030 A1 | 1/2017 |

(Continued)

OTHER PUBLICATIONS

International Search Report and Written Opinion for International Patent Application No. PCT/IB2017/001653, dated Jul. 27, 2018, 9 pages.

*Primary Examiner* — Ibrahim A Khan
(74) *Attorney, Agent, or Firm* — Withrow & Terranova, PLLC (57) ABSTRACT

The invention relates to a vehicle control panel (15) that comprises:—at least one clickable key (20) to which is assigned at least one function, said key (20) being configured to move at least between an inactive position and an active position in which said function is activated;—a screen (25) for displaying the current function of the key (20). The function is automatically assigned to the key (20) depending on a current parameter of the vehicle equipped with said control panel (15) or on a current context-related parameter.

14 Claims, 4 Drawing Sheets

(52) U.S. Cl.
CPC ............... *B60K 2370/122* (2019.05); *B60K 2370/1438* (2019.05); *B60K 2370/158* (2019.05); *B60K 2370/782* (2019.05)

(58) Field of Classification Search
CPC ........ B60K 2370/158; B60K 2370/782; B60K 2370/111; B60K 2370/128; B60K 2370/139; B60K 2370/143; B60K 2370/1537; H01H 2219/039; H01H 2300/04
See application file for complete search history.

(56) References Cited

U.S. PATENT DOCUMENTS

| | | | | |
|---|---|---|---|---|
| 2004/0201578 | A1* | 10/2004 | Sadahiro | G06F 3/0488 345/173 |
| 2005/0202845 | A1* | 9/2005 | Sasaki | G08G 1/096741 455/556.2 |
| 2005/0204898 | A1* | 9/2005 | Adams | G10G 7/02 84/454 |
| 2006/0044258 | A1* | 3/2006 | Cruz-Hernandez | G06F 3/016 345/156 |
| 2006/0227066 | A1* | 10/2006 | Hu | B60K 37/06 345/7 |
| 2007/0052545 | A1* | 3/2007 | Le Gallic | B60H 1/00985 340/815.4 |
| 2007/0063980 | A1* | 3/2007 | Eich | G06F 3/04886 345/173 |
| 2007/0200875 | A1* | 8/2007 | Seeger | H03J 1/048 345/902 |
| 2007/0247420 | A1* | 10/2007 | Strohband | H01H 13/84 345/156 |
| 2010/0204915 | A1* | 8/2010 | Kuenzner | G06F 3/0238 345/172 |
| 2010/0207748 | A1* | 8/2010 | Distler | B60K 37/06 340/425.5 |
| 2010/0268426 | A1* | 10/2010 | Pathak | G06F 3/04886 345/173 |
| 2012/0221200 | A1* | 8/2012 | Golomb | B60Q 1/0082 701/1 |
| 2014/0371987 | A1* | 12/2014 | Van Wiemeersch | G06F 3/01 701/41 |
| 2015/0029106 | A1* | 1/2015 | Boebinger | G06F 3/0238 345/172 |
| 2015/0091874 | A1* | 4/2015 | Drescher | B60K 35/00 345/175 |
| 2015/0324098 | A1 | 11/2015 | Dickow et al. | |
| 2015/0344059 | A1* | 12/2015 | Kim | G06F 3/0219 345/184 |
| 2017/0013188 | A1* | 1/2017 | Kothari | B60R 1/00 |
| 2018/0154896 | A1* | 6/2018 | Seto | G08G 1/162 |
| 2019/0009676 | A1* | 1/2019 | Yokota | B60K 35/00 |
| 2020/0218442 | A1* | 7/2020 | Shin | G06V 10/811 |

FOREIGN PATENT DOCUMENTS

| | | |
|---|---|---|
| EP | 2669764 A2 | 12/2013 |
| GB | 2494420 A | 3/2013 |

* cited by examiner

CONTROL PANEL FOR A VEHICLE

This application is a 35 USC 371 national phase filing of International Application No. PCT/IB2017/001653, filed November 24, 2017, the disclosure of which is incorporated herein by reference in its entirety.

TECHNICAL FIELD

The invention relates to a control panel for a vehicle, to a control system for a vehicle, said system comprising such a control panel. The invention also relates to a vehicle comprising such a control panel or such a control system.

BACKGROUND

Vehicles are conventionally equipped with a control panel comprising keys for activating various functions of the vehicle.

As the vehicles become more sophisticated and the drivers more demanding regarding comfort and vehicle options, the number of functions available through the control panel tends to significantly increase. This can be achieved by providing more keys on the control panel, but there are practical limits to this approach due to the space available in the vehicle, for example on the dashboard. Moreover, having a great number of keys is not desirable from a safety standpoint, as it may entail a loss of concentration for the driver. Alternatively, one key can be assigned several functions, one function or another being activated, typically depending on the number of times the driver presses the key within a short period of time. Such an implementation can be inconvenient, as it may be difficult for the driver to select the right function while driving. Furthermore, it may be a problem in terms of safety.

SUMMARY

An object of the invention is to provide a control panel for a vehicle which allows activating a significant number of functions, taking into account the space limitations imposed by the vehicle internal layout, and under excellent safety conditions.

Another object of the invention is to provide a control panel for a vehicle thanks to which 30 the driver can quickly and easily activate the function he/she currently needs.

To that end, according to a first aspect, the invention relates to a control panel for a vehicle, comprising:
  at least one clickable key to which is assigned at least one function, said key being configured to move at least between an inactive position and an active position in which said function is activated;
  a screen for displaying the current function of the key; wherein the function is automatically assigned to the key depending on a current parameter of the vehicle equipped with said control panel or on a current context-related parameter.

Thus, owing to the invention, it is possible to provide a great number of functions without requiring a large control panel, and without making the selection of the desired function complicated for the driver. Indeed, as the available functions at a specific moment are only the relevant ones, given the current context and vehicle state, only a limited number of keys is necessary. This minimalist arrangement is nevertheless very convenient and efficient as:

on the one hand, the function is automatically assigned to the key depending on the current parameter(s) and automatically changed if the parameter(s) change(s);
and, on the other hand, the current function of the key is displayed on the screen, which ensures the driver knows which key to use to activate the function he currently needs, even if the functions change with the parameter(s) evolution.

In addition to increasing flexibility and reducing allocated space, weight and cost, providing a screen corresponding to the function(s) assigned to the key(s) further allows improving the functions display, as it makes it possible to vary colours, to use animated pictures, etc.

Furthermore, providing a clickable key is advantageous in that the driver can feel the function has been activated, without being obliged to take his eyes off the road. Thanks to this feature, activating a function is further made easier even when wearing gloves.

The key can be moved from its inactive position to its active position by finger pressure, for example. Furthermore, preferably, the key can automatically move back to its inactive position when pressure is released. Activating the function may require maintaining the key in its active position for a predetermined period of time. Besides, although this may not be necessary given the high adaptability provided by the control panel of the invention, it is not excluded that one key be assigned several different functions at a given moment.

Another advantage of the invention is the reduction of the number of references on the supplier side, aftermarket side and production facilities side. Indeed, there is no need to provide a large number of different control panels, insofar as one and the same control panel can be adapted to the driver's needs.

The parameter of the vehicle can be one of or a combination of at least two of:
  a parameter related to the vehicle operation, chosen in the group comprising:
    a status of the vehicle engine (stopped/running);
    an operating mode of the vehicle (stopped/in motion; machining/driving; forward/rearward motion; cruise control/manual driving mode; PTO (power take-off) mode; etc.);
  a parameter related to the operation, status or position of a component of the vehicle (radio, lights, windows, roof, suspensions, air conditioning, gear, engine, etc.).

The context-related parameter can be one of or a combination of at least two of the ambient light, the presence of an object or a person in the vicinity of the vehicle, the reception of an incoming call or incoming message (such as a SMS, a MMS, or an email).

The control panel may further comprise a control member for manually changing the current function(s) assigned to the key(s) regardless of the current vehicle parameter or context-related parameter. Preferably, such a manual setting may take precedence over the automatic setting (except, for example when safety functions have been automatically assigned to the keys). This gives more flexibility for the driver, without preventing the subsequent automatic operation of the control panel. Examples of a control member include a free wheel (typically located on the dashboard) or a touchpad.

In an embodiment, the function assigned to one key may belong to a list of functions which are pre-established, for example depending on the type of the vehicle, the initial configuration of the vehicle and/or the user's preferences. Said list of functions can be pre-established by a vehicle bodybuilder, a fleet manager, or a vehicle driver (for example by manual choice). This allows customizing the control panel, and can help increasing more direct access to specific functions while limiting the number of useless functions given the expected needs.

Besides, the set of functions assigned to the only key or all the keys of the control panel at a given moment can be chosen among several predetermined sets of functions, one set of function corresponding to one vehicle parameter or context-related parameter. The sets can be predetermined for example depending on the type of the vehicle, the initial configuration of the vehicle and/or the user's preferences, for example by a vehicle bodybuilder, a fleet manager, or a vehicle driver, in order to adapt the control panel to the expected needs.

The control panel may comprise several distinct areas each being assigned one function. In an implementation, the control panel may comprise several keys each being assigned at least one function; in another implementation, one key can define several separate areas, each area being assigned at least one function.

According to an embodiment, the screen of the control panel is included in the key. For example, the screen can form the upper part of the key (with possibly a protective layer upon it). Alternatively, the screen can be arranged under the key, with the key upper face then being transparent.

According to another embodiment, the screen of the control panel is separate from the key. For example, the screen can be arranged in a remote location, such as the vehicle cluster. With this arrangement, the key may be devoid of any icon.

According to an embodiment, the control panel includes several distinct keys individually and independently moveable between the inactive position and the active position. Said keys can have edges detectable when touched by the user.

With such an arrangement, each key comprising its own screen, a group of several adjacent keys can be assigned one and the same function, at a given moment. Then, a single icon representing said function is displayed on the whole surface formed by the screens of the group of keys, and said function is activated when any key of the group of keys is moved to its active position. This feature ensures a better visibility as the icon 35 representing the function can be bigger insofar as it is displayed on a larger screen. This can be used for warning or emergency functions. This can also be used for displaying the image provided by a vehicle rear-view camera, or specific information such as a help menu, an instruction manual, a welcome message, etc. Grouping several keys makes it possible to further increase customization, not only regarding available functions or key position on the control panel, but also regarding key size.

According to another embodiment, the control panel comprises a single key on which are defined at least two separate areas, one function being assigned to each area. Then, the key further includes a touch-sensitive surface allowing determining which area has been acted upon, i.e. which function has been activated. In other words, even if the whole key is depressed, only one function can be activated. Such a key may also exhibit the usual functionalities of a touch-sensitive surface (drag, enlarge or reduce a picture, etc.).

The control panel may further comprise a vibratory module capable of making at least part of the control panel vibrate, for allowing a user to feel a specific area of the control panel (e.g. an edge of a key) and/or a specific action on the control panel (e.g. scrolling). This allows reducing driver inattention as the driver can feel his actions on the control panel without looking at the keys. Vibration is not necessarily located in the concerned specific area of the control panel, such as a key edge; the control panel can be made to vibrate as a whole, but when the driver finger is located at said key edge.

According to a second aspect, the invention relates to a control system for a vehicle, which comprises:
  at least one control panel as previously described;
  at least one sensor of a parameter of the vehicle equipped with said control panel or of a context-related parameter;
  and a control unit capable of receiving data from the sensor and accordingly assigning a function to the key or each key of the control panel.

The term "sensor" has to be understood in its broadest meaning. It may be a rear parking aid or rear camera sensor, a light sensor, etc. but also a means for detecting the radio has been turned on, such as a data conveyed on the vehicle communication network (Lin or CAN for example).

According to a third aspect, the invention relates to a vehicle comprising a control panel or a control system as previously described.

The control panel can be located on the vehicle dashboard. With such an arrangement, the screen can be included in the key.

Alternatively, the control panel can be located on a steering wheel of the vehicle, close to the driver's hands in use. With such an arrangement, the screen can be arranged on the vehicle cluster.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
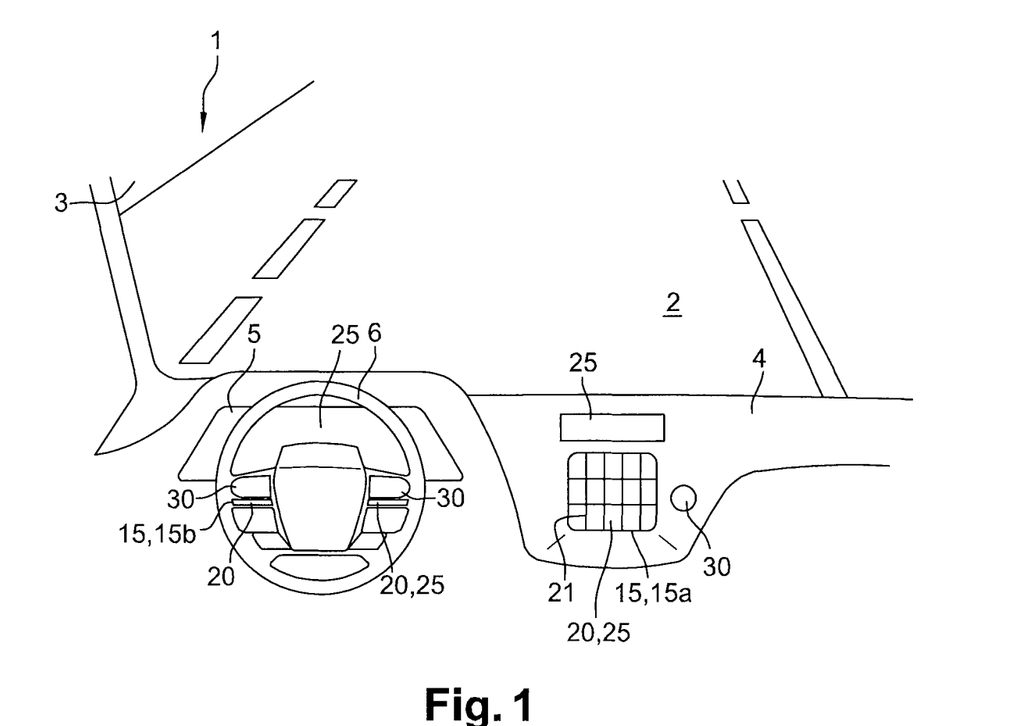
FIG. 1 is a perspective view forward from the interior of a vehicle, showing a steering wheel and control panels according to embodiments of the invention.

FIG. 1 shows a vehicle 1, as seen by a driver of the vehicle, looking the road 2 forward, from the interior of the vehicle, through the windscreen 3. The vehicle 1 comprises a dashboard 4, a cluster 5, and a steering wheel 6.

The invention can be applied in heavy-duty, medium-duty vehicles, such as trucks, buses, and in working machines (industrial construction machines or construction equipment).

Figure 2:
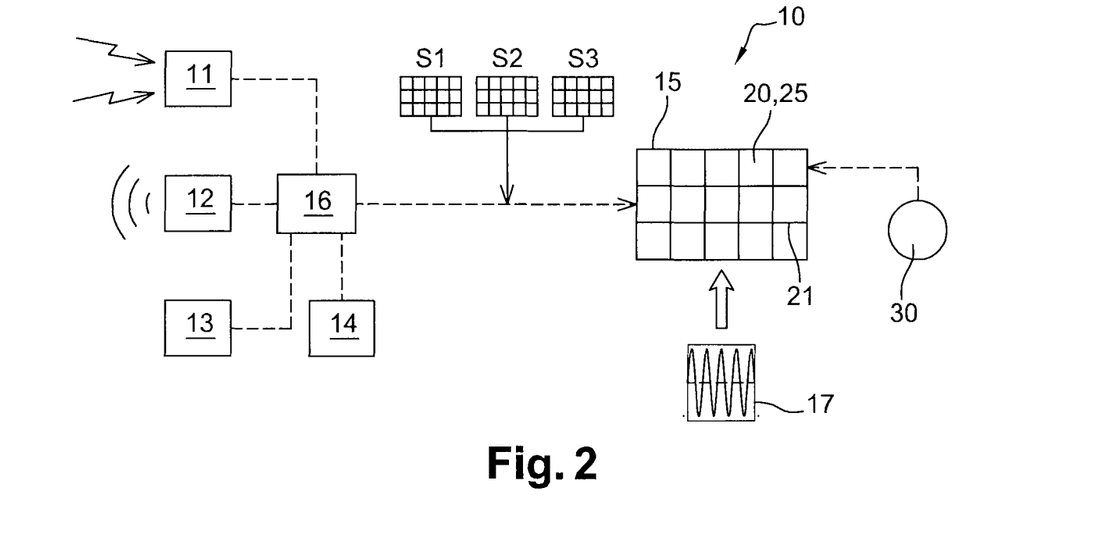
FIG. 2 is a schematic view of a control system according to the invention, in particular comprising a control panel and sensors.

The vehicle 1 includes a control system 10, as schematically depicted in FIG. 2, which comprises at least one control panel 15 for allowing the user to select and activate one or several appropriate functions for operating the vehicle, for operating one of the vehicle components, for carrying out an action, etc.

The control panel 15 comprises one or several clickable keys 20. At least one function is assigned to one key 20, and said key 20 is configured to move at least between an inactive position and an active position in which said function is activated. The control panel 15 further comprises a screen 25 for displaying the current function of the key 20. According to the invention, the function is automatically assigned to the key 20 depending on a current parameter of the vehicle 1 or on a current context-related parameter.

In other words, the function mapping on the control panel is neither fixed (as it depends on the above mentioned parameters) nor definitive (as it may be reprogrammed over time).

The above mentioned parameter of the vehicle 1 can be a parameter related to the vehicle operation, such as:
a status of the vehicle engine (stopped/running);
an operating mode of the vehicle (stopped/in motion; machining/driving; forward/rearward motion; cruise control/manual driving mode; PTO (power take-off) mode, etc.).

Said parameter of the vehicle 1 can be a parameter related to the operation, status or position of a component of the vehicle 1, such as the radio, the lights, one window, the roof, the suspensions, the air conditioning system, etc.

As regards the context-related parameter, it can be the ambient light, the presence of an object or a person in the vicinity of the vehicle, the reception of an incoming call or incoming message.

In practice, the control system 10 can include at least one sensor of a parameter of the vehicle or of a context-related parameter. In FIG. 2 are illustrated a light sensor 11 capable of giving information on the ambient brightness, a rear parking aid or rear camera sensor 12 indicating that the reverse gear is engaged, and two other sensors 13, 14 which can be a roof opening sensor, a temperature sensor, a vehicle speed sensor, an obstacle detection sensor, etc. The control system 10 can further include a control unit 16 capable of receiving data from the sensor(s) 11-14 and accordingly assigning a function to the key 20 or each key of the control panel 15. The control unit 16 can be the electrical control unit (ECU) of the vehicle 1.

Thus, when one of said parameters changes, the function assigned to one key 20 of the control panel 15 automatically changes and the current function is displayed on the screen 25 for the driver's information. The current function may be represented by an appropriate icon easily comprehensible for the driver. The icon can be displayed in black and white, with colours, with highlights, as an animated picture, etc. In case one key is not assigned any function, at a given moment, the screen displays no corresponding icon.

Examples of parameters entailing automatic changes of function mapping are listed below:
incoming call: displaying functions related to phone;
window or roof opening: displaying functions related to air conditioning;
headlights activation: displaying functions related to internal/external lighting;
pressing any button of the radio: displaying functions related to the radio (volume setting, Bluetooth, equalizer, sub-woofer, etc.);
engaging reverse gear: displaying an image provided by a rear camera;
detecting an obstacle rearward: displaying an image provided by a rear camera;
in the drive mode, at zero vehicle speed: displaying an image provided by a front and downward oriented camera;
at a vehicle speed higher than 5 km/h (for instance) or if an obstacle is detected: displaying an image provided by a front forward oriented camera;
pressing the ECS (Electrical Control Suspension) remote control: displaying functions related to suspensions;
pressing the LECM (Living Environment Control Module) remote control: displaying functions related to bodybuilders;
receiving a message (such as an email, SMS or MMS): displaying functions related to messages, such as keyboard, contacts, etc.;
activating the PTO (power take-off) mode and stopping the vehicle: displaying functions related to bodybuilders and PTO setting;
at a vehicle speed higher than 5 km/h (for instance): displaying functions related to the driving mode;
shifting from autonomous driving to manual driving: displaying a message "back to manual driving".

Figure 3:
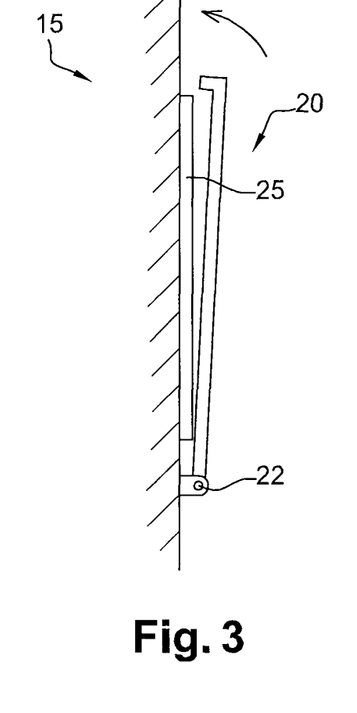
FIGS. 3 and 4 schematically show two embodiments of a clickable key of a control panel of the invention.
Figure 4:
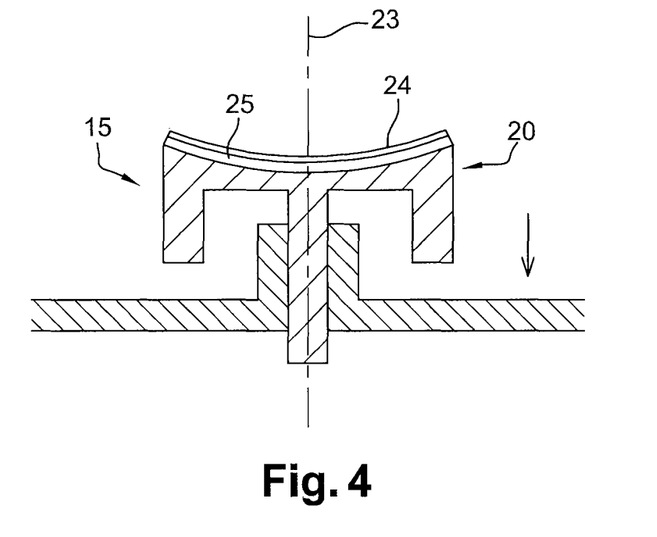

According to an embodiment, a screen 25 may be included in the or each key 20. To that end, as shown in FIG. 3, the screen 25 can be arranged under the key 20, with the key upper face then being transparent. In another configuration, as shown in FIG. 4, the screen 25 can form the upper part of the key 20. A protective layer 24 preferably transparent can be provided upon the screen 25 for protection purposes.

Alternatively, the screen 25 can be separate from the key(s) 20. This later configuration is of particular interest when the keys 20 are on the steering wheel 6, i.e. can be actuated by the driver without looking at the keys 20. Then, the current function of one key can be displayed on a screen at which the driver can easily glance, in order to minimize the driver's inattention. For example, such a remote screen can be located on the cluster 5.

The set of functions assigned to the key(s) 20 of the control panel 15 at a given moment can be chosen among several predetermined sets of functions. In FIG. 2, three sets of functions S1, S2, S3 are illustrated; however, this number of sets is not limitative. One set of function corresponds to one vehicle parameter or context-related parameter. The sets of functions can be predetermined for example depending on the type of the vehicle, the initial configuration of the vehicle and/or the user's preferences. The sets of functions can be predetermined by a vehicle bodybuilder, a fleet manager, or a vehicle driver, in order to adapt the control panel 15 to the expected needs.

In addition, the sets of functions can subsequently be updated, tuned or reprogrammed in case the needs change. For that purpose, thanks to the invention, no hardware modification is required, only changes on the software have to be made. This brings flexibility to support the bodybuilder, customer adaptation and after market businesses.

The control panel 15 may also comprise a control member 30 for manually changing the current function(s) assigned to the key(s) 20 regardless of the current vehicle parameter or context-related parameter. Such a disposition may be useful when the driver wants or needs to activate one function which is not currently assigned to one key 20.

Providing a clickable key rather than a touch-sensitive key helps the driver to ensure that the key has been properly pressed, i.e. that the function has been properly activated, without take his eyes off the road. The keys 20 of the control panel 15 can have raised edges 21 for the user to better feel where his finger is and has to press, and to avoid inadvertent activation of an adjacent key 20. However, other technical solutions can be implemented for helping the user pressing the right key 20.

For example, the control panel 15 may comprise a vibratory module 17 capable of making at least part of the control panel 15 vibrate. Only one, or several keys 20, can be made to vibrate by the vibratory module 17. Alternatively, the whole area of the control panel 15 can be made to vibrate. This allows the user to feel a specific area of the control panel 15, such as a key edge, of the control panel border. Besides, the vibratory module 17 may allow the user to feel a specific action on the control panel, for example the fact that a function has been activated.

In practice, as schematically shown in FIGS. 3 and 4, the key 20 can be urged to its inactive position (for example by a biasing member not illustrated) and can be moved towards its active position by a finger pressure. For example, such a finger pressure tends to move the key 20 closer to the support on which the key is mounted. The movement of the key 20 can be a rotating movement about a hinge axis 22 parallel to the support (FIG. 3) or a sliding movement along a sliding axis 23 orthogonal to the support (FIG. 4). The travel range of the key 20, from its inactive position to its active position, can be around 0.75 mm. The support can be a part of the control panel 15 secured to the vehicle 1, such as the dashboard 4 or the steering wheel 6.

Two specific, combinable and non limiting embodiments of the invention will now be described.

According to a first embodiment of the invention, the control panel 15a comprises several distinct keys 20 which are individually and independently moveable between the inactive position and the active position, for example according to a sliding movement. The control panel 15a can be divided into substantially identical keys 20 (as in FIG. 1), or can comprise small keys and larger keys (as in FIG. 7).

Each key 20 includes a screen 25 capable of displaying the function currently assigned to the key 20. Although the functions are automatically assigned to the keys 20 depending on a current vehicle parameter or current context-related parameter, a control member 30, for example in the form of a rotating free wheel, can be provided for the user to manually change the available functions.

The control panel 15a, as well as the control member 30, can be located on the vehicle dashboard 4.

Figure 5:
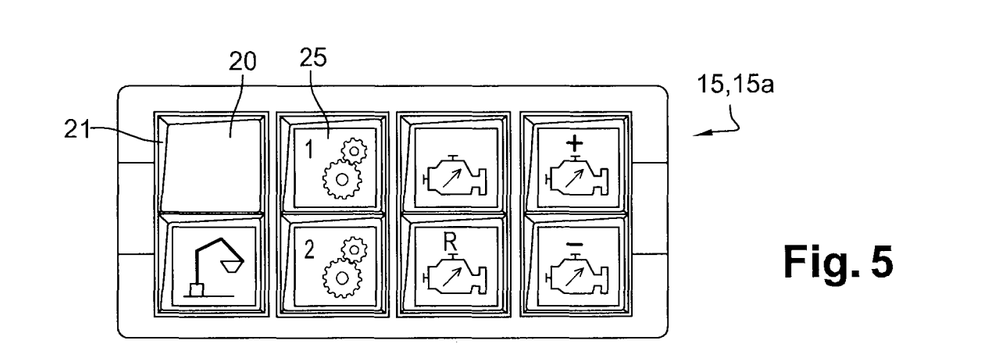
FIG. 5-8 are various mappings of the functions assigned to keys of a control panel according to one embodiment of the invention.
Figure 6:
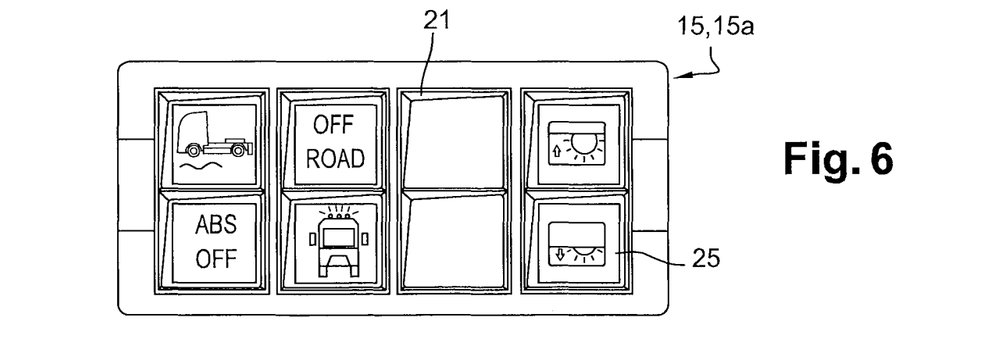

FIGS. 5 and 6 show the control panel 15a with various automatic mappings, i.e. with various sets of functions currently assigned to the keys, depending on at least one parameter. This dynamic allocation of functions, i.e. automatically assigning the appropriate functions to the keys based on said parameter, ensures the functions available to the user are only the ones adapted to the current situation.

In FIG. 5, the screens 25 of the keys 20 of the control panel 15a display a set of functions adapted when the driver is machining. The function of the keys represented in FIG. 5 can be described as follow:

| Empty | Activation of PTO1 | Activation of Engine Speed Control | Engine speed Control + |
|---|---|---|---|
| Crane | Activation of PTO2 | Engine Speed Control Resume | Engine speed Control − |

Assigning these functions to the keys can be triggered by a vehicle that is stopped i.e. speed of 0 km/h. Then, depending on the truck variant and the options available, driver should be able to activate PTO (if PTO are available), use the crane if the truck variant has a crane, etc. . . . .

In FIG. 6, the screens 25 of the keys 20 of the control panel 15a display a set of functions adapted when the driver is on the road. The function of the keys represented in FIG. 6 can be described as follow:

| Muddy side | Off Road | Empty | Front sun visor up |
|---|---|---|---|
| ABS OFF | Extra lamps | Empty | Front sun visor down |

Assigning these functions to the keys can be triggered by default after the vehicle starts.

Figure 7:
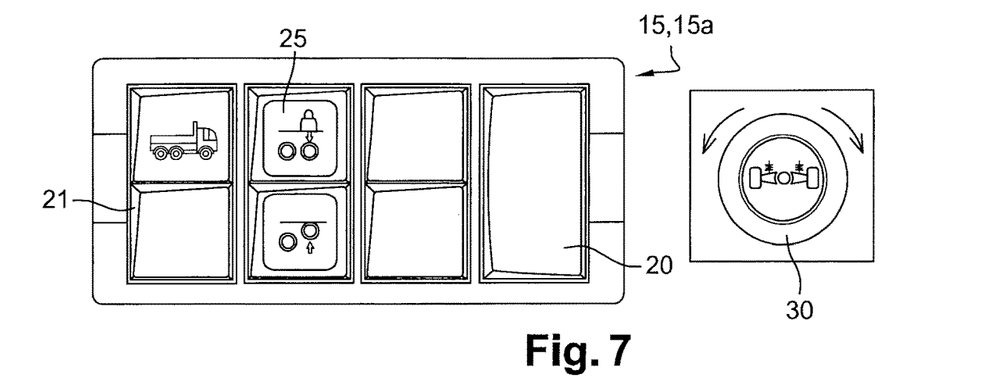
Figure 8:
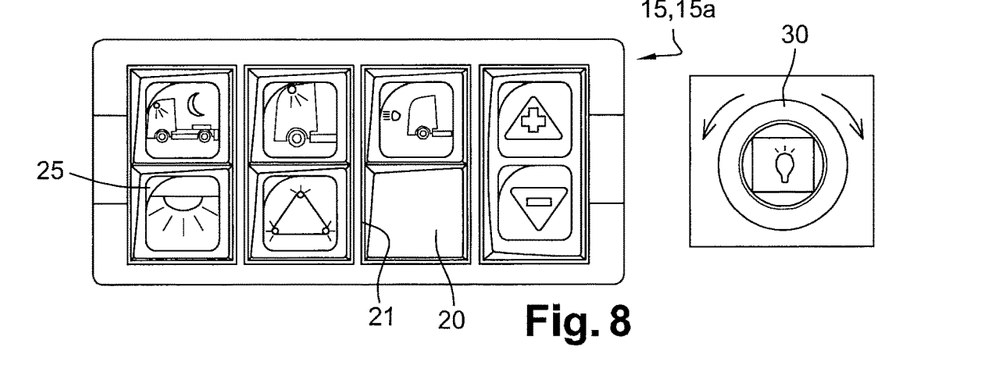

FIGS. 7 and 8 show the control panel 15a with various other mappings, following a manual selection by the driver, thanks to the free wheel 30 for example. Such a manual selection allows overriding the automatic function assignment, in case the driver has a specific need at a given moment.

In FIG. 7, the screens 25 of the keys 20 of the control panel 15a display a set of functions adapted when the driver needs to act on the vehicle suspensions. This follows the selection of a suspension mode by the driver. The function of the keys represented in FIG. 7 can be described as follow:

| BodyBuilder function (drump lift) | Boogie Ratio Control | Empty | Empty |
|---|---|---|---|
| Empty | Boogie Lift Selector (Up and Down) | Empty | |

In FIG. 8, the screens 25 of the keys 20 of the control panel 15a display a set of functions related to the vehicle lights, after the driver has selected the light mode on the free wheel 30. The function of the keys represented in FIG. 8 can be described as follow:

| Driving Lighting (red) | Interior light | Plough Light | Plus (increase intensity of selected light) |
|---|---|---|---|
| Activity Lighting | Roof electrical triangle | Empty | Minus (decrease intensity of selected light) |

Alternatively, such a function mapping could have been automatically assigned following the detection by the light sensor 11, of a low ambient light.

As can be seen in FIG. 8, the right key 20 is larger than the others, and can be pressed either on its upper area or on its lower area, to set the desired brightness of one light. Such a key can be articulated along a middle axis rather than arranged to be pressed according to a sliding movement as previously described.

Alternative key activations might be envisaged. At least one key could be designed so that it has distinct active positions (for example following a light pressure or a higher pressure), corresponding to distinct functions. Besides, several different functions could be assigned to a single key; in this case, the selection of the desired function could be achieved by a short or longer pressure period on the key, by a double click, or other appropriate action. Although these previously described arrangements may not be fully satisfactory, and although the invention makes them unnecessary as the useful functions are automatically made available to the driver, these arrangements should not be considered as not applicable with the control panel of the invention.

With a control panel 15a comprising several individual keys 20 each having its own screen 25, it may be desirable to assign one and the same function to a group of several adjacent keys 20, at a given moment. In such a situation, a single icon representing said function can be displayed on the whole surface formed by the screens 25 of the group of keys 20, which makes it possible to display a significantly larger, image. Then, said function is activated when any key 20 of the group of keys is moved to its active position.

Figure 9:
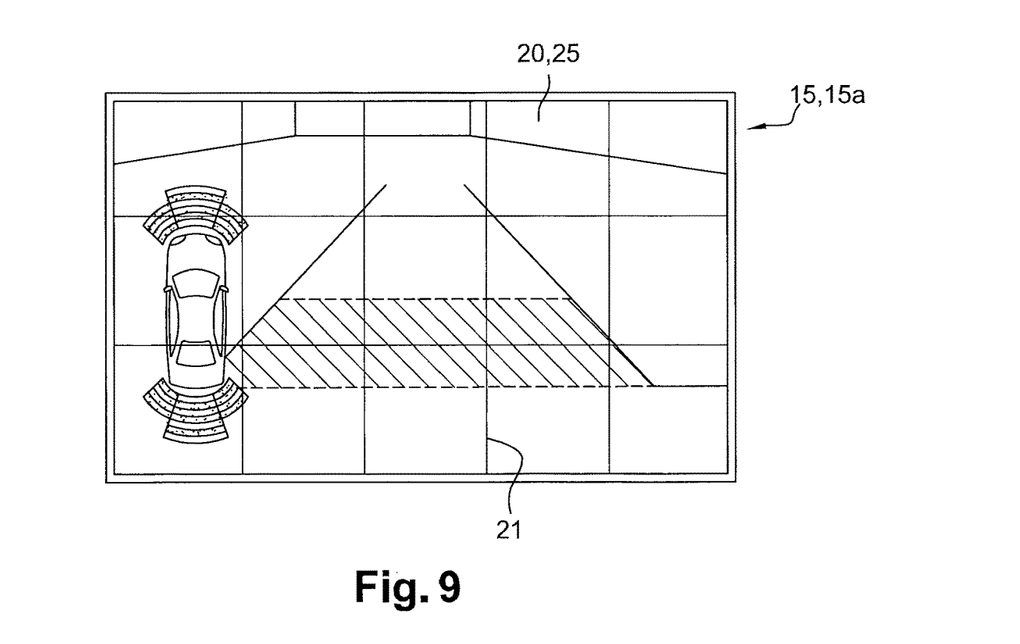
FIG. 9 shows another mapping of the functions assigned to the keys of the control panel of FIG. 5-8.

FIG. 9 shows such a configuration with a group formed of all keys 20 of the control panel 15a (which should not be considered as limitative). The image displayed if the one provided by the rear camera, for parking aid. It can be automatically displayed on the screens 25 following the reverse gear engagement.

Examples when several keys are grouped for an emergency function are listed below:
  emergency calls in systems of emergency response such as Era Glonass, for example after the Airbag system triggering or a critical error message (such as engine failure);
  "hazard warning" display when the hazard warning button is activated;
  when the emergency function is likely to be activated by a driver wearing gloves, grouping keys for this function makes it possible to increase the active contact area, and thus to make activation easier;
  breakdown detection on the vehicle: displaying the technical aid calling button on a larger area.

Examples when several keys are grouped for displaying a larger image are listed below:
  when activating the phone mirroring mode: duplicating the phone screen on the keys screens;
  engaging reverse gear: displaying an image provided by a rear camera;
  detecting an obstacle rearward: displaying an image provided by a rear camera;
  in the drive mode, at zero vehicle speed: displaying an image provided by a front and downward oriented camera;
  at a vehicle speed higher than 5 km/h (for instance) or if an obstacle is detected: displaying an image provided by a front forward oriented camera;
  pressing a specific key for some time: displaying help, instruction guide and/or explanatory drawings regarding the specific function assigned to said key;
  when the engine is turned on: displaying a welcome message.

It may be envisaged to create at least two separate groups of keys 20 on the control panel 15a, as each key 20 comprises its own screen. One group could display the images provided by the rear camera, while another group could display functions related to the reverse gear (such as deactivation of the reverse buzzer).

According to a second embodiment of the invention, the control panel 15b comprises a single key 20 on which are defined at least two separate areas 27. One function is assigned to each area 27. Moreover, the key 20 includes a touch-sensitive surface allowing determining which area 27 has been acted upon, i.e. which function has been activated. Thus, even if the whole key 20 is moved from its inactive position towards the active position, for example according to a pivoting movement, the control system 10 makes it possible to activate only the correct function.

The number of separate areas 27 on the key 20, i.e. the number of available functions at a given moment, may vary depending on the vehicle parameter or context-related parameter.

The key 20 can include a screen 25 capable of displaying the function currently assigned to each area 27 of the key 20. Alternatively, or in addition, the control panel may include a screen 25 separate from the key. Such a screen 25 may be located on the vehicle cluster 5, and/on the dashboard 4.

Although the functions are automatically assigned to the keys 20 depending on a current vehicle parameter or current context-related parameter, a control member 30, for example in the form of a touchpad, can be provided for the user to manually change the available functions.

Figure 10:
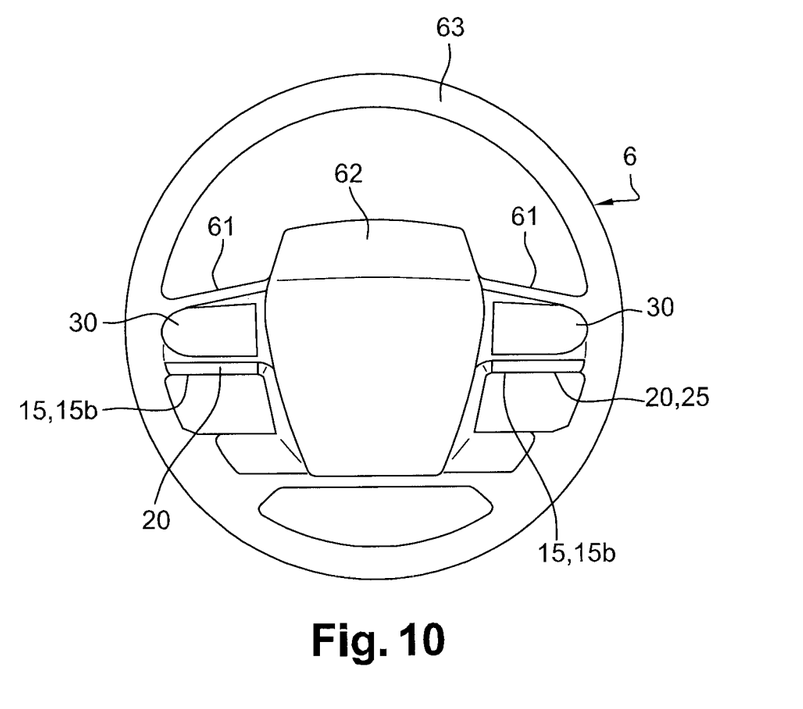
FIG. 10 shows a steering wheel including keys of a control panel according to another embodiment of the invention.

The control panel 15b, as well as the control member 30, can be located on the vehicle steering wheel 6. They are preferably located close to the driver's hands in use, for example on each portion 61 extending between the central portion 62 (conventionally housing a horn and/or an air bag) and the peripheral portion 63 (see FIG. 10).

Figure 11:
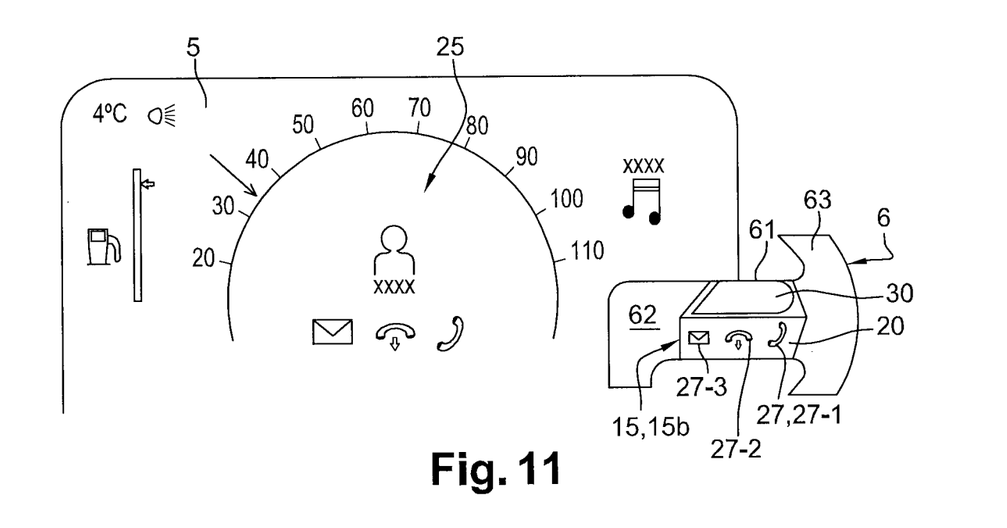
FIG. 11 is a schematic and partial view of the steering wheel of FIG. 7 and the corresponding screen of the control panel.

FIG. 11 shows the key mapping during an incoming call. The control unit 16 has received the information that a person is calling and, automatically, the areas 27 of the key 20 have been assigned appropriate functions. In the illustrated example, the key 20 comprises three separate areas, namely an area 27-1 for answering the call, an area 27-2 for declining the call, and an area 27-3 for declining the call and sending a SMS to the person, for informing of the driver's non availability.

The three above functions can be represented by icons on the screen 25 provided on the key 20. They can also be represented by the same icons on a remote screen 25 more easily visible for the user, such as a part of the cluster 5. This remote screen 25 may display further information not displayed on the key 20, such as the name and a picture of the person calling. It can also be envisaged that the key 20 does not include any icon, the icon(s) being only displayed on the remote screen 25. A visible sign of the area 27 currently touched by the user can also be provided on the remote screen 25 to prevent the user from activating the wrong function. Said visible sign can be a movable cursor.

As regards the touchpad 30, it can greatly increase the adaptability and performance of the control panel 15b. It may exhibit the usual functionalities of a touch-sensitive surface (drag, enlarge or reduce a picture, etc.). Besides, the vibratory module 17 may be used to provide a feeling dedicated to one or several specific actions on the touchpad 30.

Thus, the control panel of the invention can be pre-customized and then automatically adapted to the current driver's needs, a manual setting overriding the automatic setting and/or a subsequent reprogramming also being possible. In other words, the invention provides a human machine interface which is highly adjustable, attractive, safe and efficient.

It is to be understood that the present invention is not limited to the embodiments described above and illustrated in the drawings; rather, the skilled person will recognize that many changes and modifications may be made within the scope of the appended claims.

The invention claimed is:

1. A control panel for a vehicle, comprising:
   at least one clickable key to which is assigned at least one function, the key being configured to move at least between an inactive position and an active position in which a current function of the at least one function is activated;
   wherein:
   the at least one function is automatically assigned to the key depending on a current parameter of the vehicle equipped with the control panel or on a current context-related parameter;
   the at least one clickable key comprises a plurality of adjacent keys assigned to a same current function, which is activated when any one of the plurality of adjacent keys is moved to the active position; and
   each key of the plurality of adjacent keys comprises a screen for displaying the same current function of the key.

2. The control panel of claim 1, wherein the current parameter of the vehicle is at least one of:
   a parameter related to vehicle operation comprising a status of a vehicle engine;
   a parameter related to vehicle operation comprising an operating mode of the vehicle;
   a parameter related to operation of the vehicle;
   a parameter related to a status of the vehicle; or
   a parameter related to a position of a component of the vehicle.

3. The control panel of claim 1, wherein the current context-related parameter is at least one of ambient light, a presence of an object or a person in a vicinity of the vehicle, and reception of an incoming call or incoming message.

4. The control panel of claim 1, further comprising a control member for manually changing the current function(s) assigned to the at least one clickable key regardless of the current vehicle parameter or context-related parameter.

5. The control panel of claim 1, wherein the function assigned to the at least one clickable key belongs to a list of functions that are pre-established.

6. The control panel of claim 5, wherein a set of functions assigned to the at least one clickable key of the control panel at a given moment is chosen from among several predetermined sets of functions, the set of functions corresponding to one vehicle parameter or context-related parameter.

7. The control panel of claim 1,
   wherein a single icon representing the same current function is displayed on a whole surface formed by the screens of the plurality of adjacent keys.

8. The control panel of claim 1,
   wherein the control panel comprises a single key on which are defined at least two separate areas, one function being assigned to each area; and
   wherein the single key further comprises a touch-sensitive surface for determining which area has been acted upon.

9. The control panel of claim 1, wherein the control panel further comprises a vibratory module configured to vibrate at least part of the control panel to allow a user to at least one of:
   feel a specific area of the control panel; or
   perform a specific action on the control panel.

10. The vehicle of claim 7, wherein each screen of the plurality of adjacent keys displays a portion of the single icon.

11. A control system for a vehicle, the control system comprising:
   at least one control panel comprising:
      at least one clickable key to which is assigned at least one function, the key being configured to move at least between an inactive position and an active position in which a current function of the at least one function is activated;
      wherein the at least one function is automatically assigned to the key depending on a current parameter of the vehicle equipped with the control panel or on a current context-related parameter;
   at least one sensor of a parameter of the vehicle equipped with the control panel or of the current context-related parameter;
   a control unit capable of receiving data from the at least one sensor and accordingly assigning a function to at least one key of the control panel;
   wherein:
   the at least one clickable key comprises a plurality of adjacent keys assigned to a same current function, which is activated when any one of the plurality of adjacent keys is moved to the active position; and
   each key of the plurality of adjacent keys comprises a screen for displaying the same current function of the key.

12. A vehicle, comprising a control panel, the control panel comprising:
   at least one clickable key to which is assigned at least one function, the key being configured to move at least between an inactive position and an active position in which a current function of the at least one function is activated;
   wherein:
   the at least one function is automatically assigned to the key depending on a current parameter of the vehicle equipped with the control panel or on a current context-related parameter;
   the at least one clickable key comprises a plurality of adjacent keys assigned to a same function, which is activated when any one of the plurality of adjacent keys is moved to the active position; and
   each key of the plurality of adjacent keys comprises a screen for displaying the same current function of the key.

13. The vehicle of claim 12, wherein the control panel is on a dashboard of the vehicle.

14. The vehicle of claim 12, wherein the control panel is on a steering wheel of the vehicle, close to a driver's hands when in use.

* * * * *